United States Patent [19]

Guba

[11] 4,053,013

[45] Oct. 11, 1977

[54] MULTI-PURPOSE APPARATUS FOR HEATING OR COOLING FLUIDS

[76] Inventor: Peter Guba, 786 Malibu Lane, Indialantic, Fla. 32903

[21] Appl. No.: 574,917

[22] Filed: May 6, 1975

[51] Int. Cl.² .......................................... F28D 11/02
[52] U.S. Cl. ..................... 165/86; 241/301; 123/141; 123/122 A; 123/119 CD
[58] Field of Search ...... 165/86; 123/122 A, 122 AA, 123/141, 41.22, 41.31, 119 CD; 415/178, 79; 239/132.1, 132.3, 132; 241/67, 301; 60/599

[56] References Cited

U.S. PATENT DOCUMENTS

| 1,106,452 | 8/1914 | Ittner | 123/122 A |
| 3,162,010 | 12/1964 | Mohrhauser | 60/39.71 X |
| 3,198,436 | 8/1965 | Kurzimski et al. | 239/132.1 |
| 3,302,882 | 2/1967 | Hutton | 239/132.3 |
| 3,339,364 | 9/1967 | Paradise et al. | 165/9 X |
| 3,398,900 | 8/1968 | Guba et al. | 241/301 |

Primary Examiner—Carroll B. Dority, Jr.
Assistant Examiner—Theophil W. Streule, Jr.
Attorney, Agent, or Firm—Duckworth, Hobby & Allen

[57] ABSTRACT

Apparatus for heating or cooling a fluid includes a housing having a chamber, the housing having an inlet and an outlet with a flow path for the fluid defined therebetween, the inlet communicating between the chamber and a source of the fluid. A rotor is positioned within the chamber and includes a tubular member passing through the rotor and in the flow path between the inlet and the outlet. Portions of the rotor surrounding the tubular member define a hollow space, the rotor being mounted on a hollow shaft in order that means, such as another fluid, may be utilized at the periphery of the tubular member to effect a change in the temperature of the fluid passing through the tubular member.

22 Claims, 9 Drawing Figures

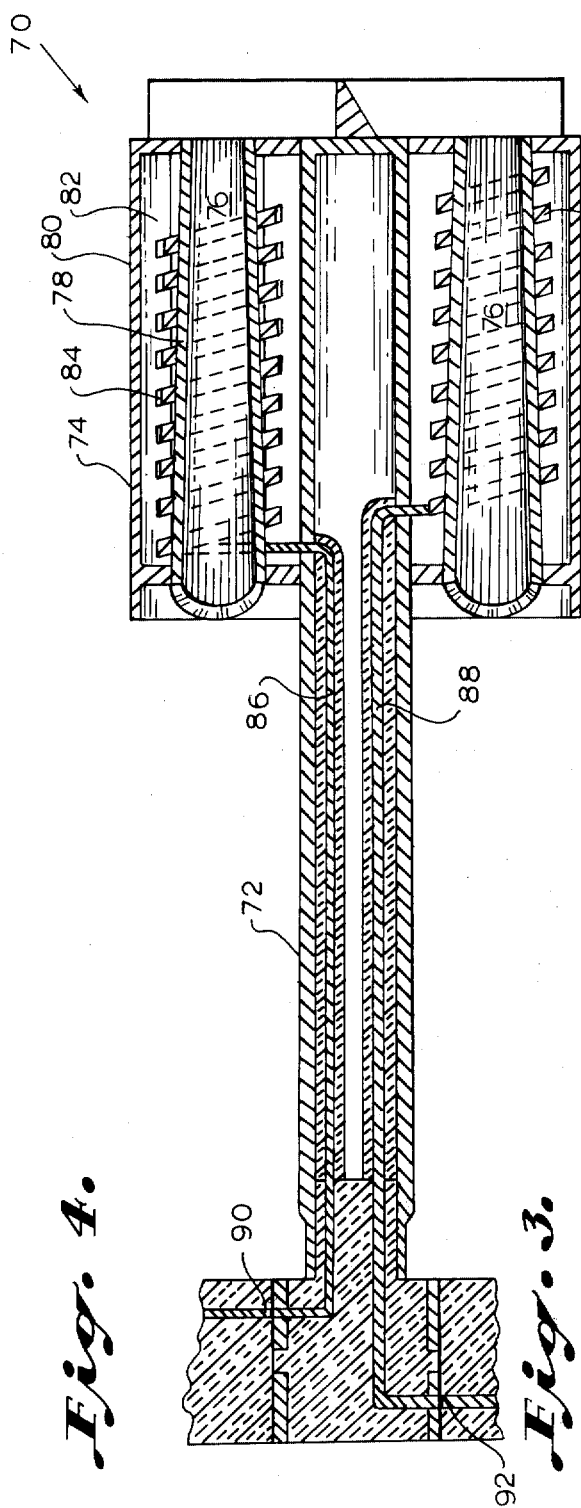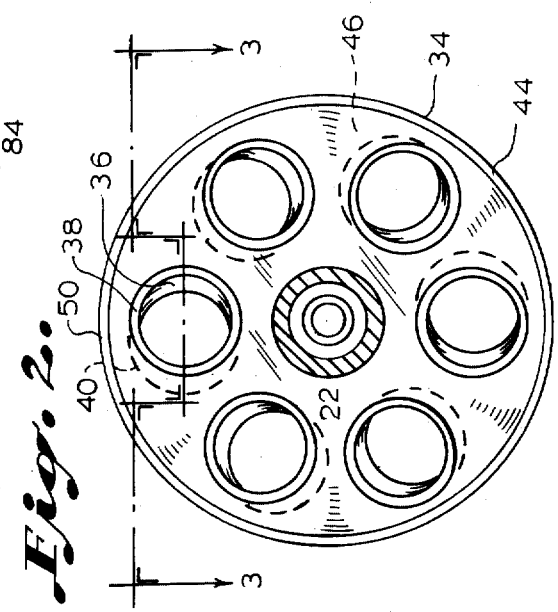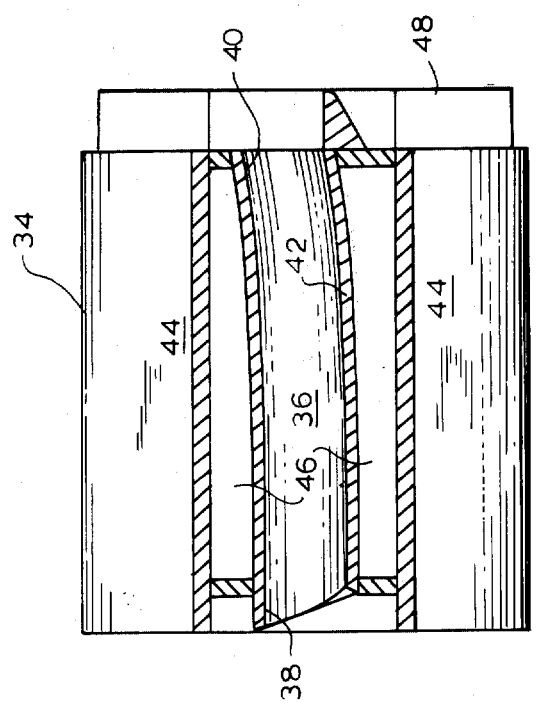

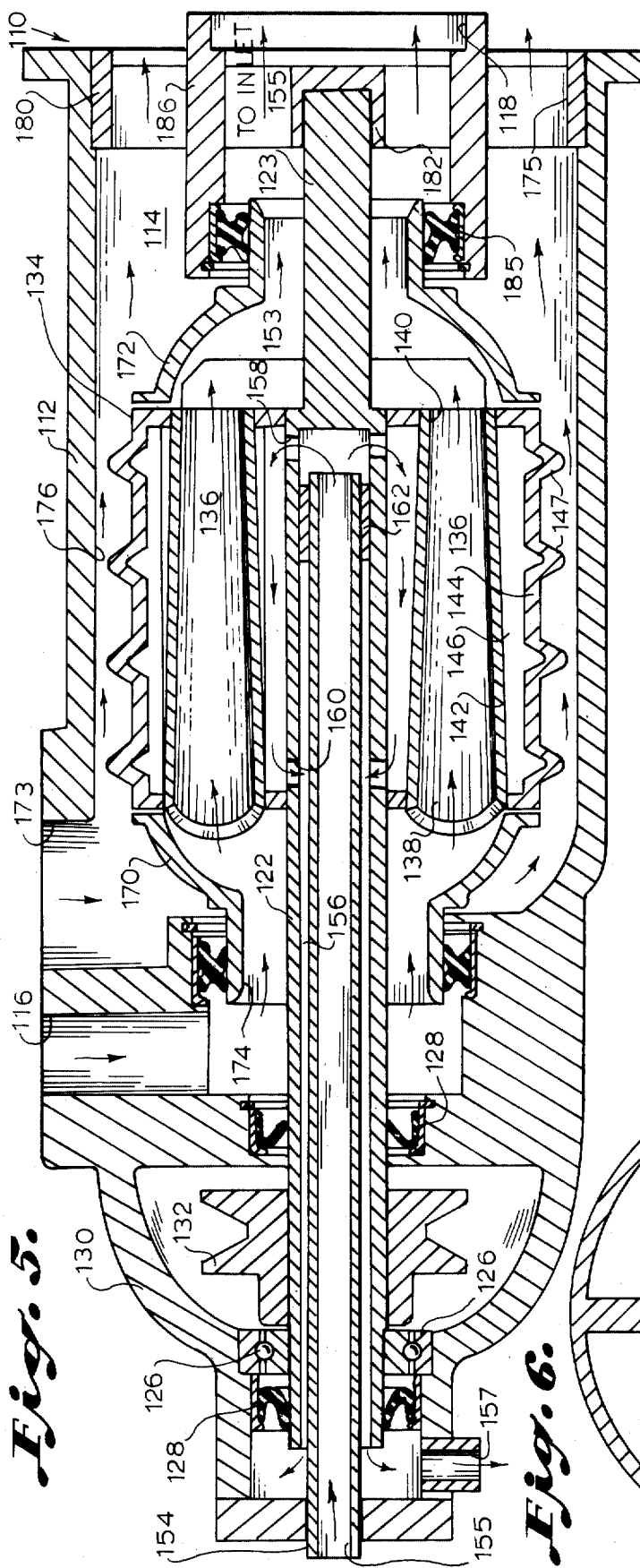
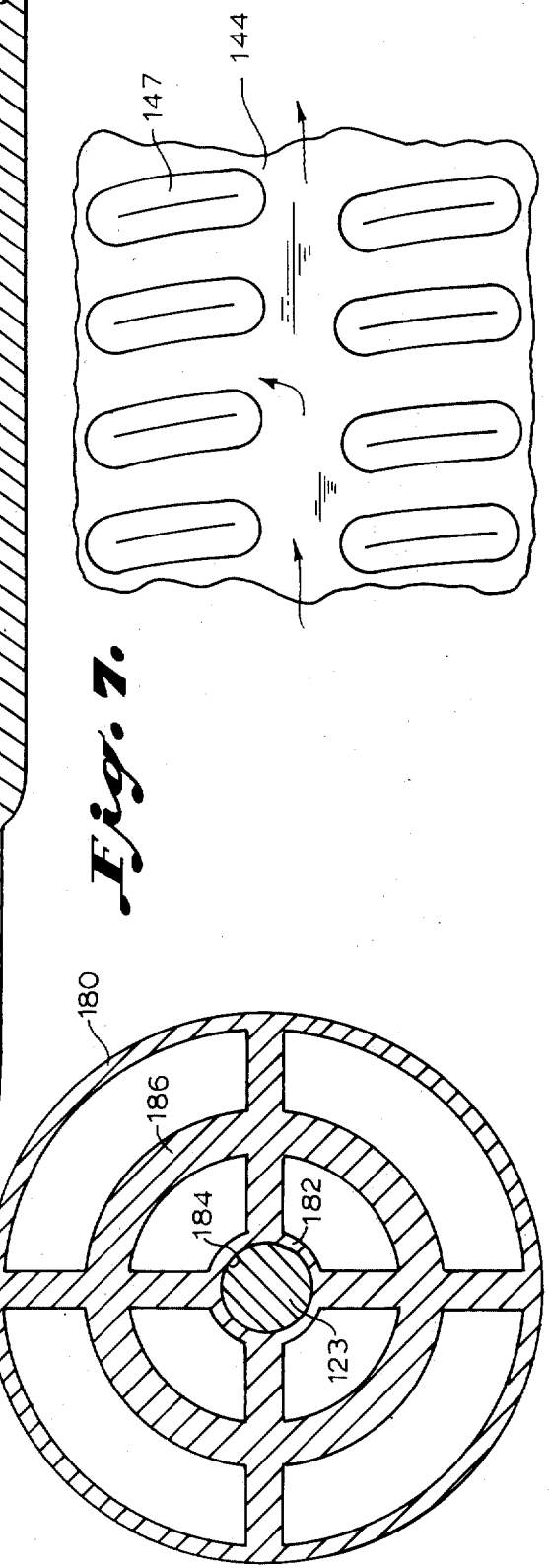
Fig. 5.
Fig. 6.
Fig. 7.

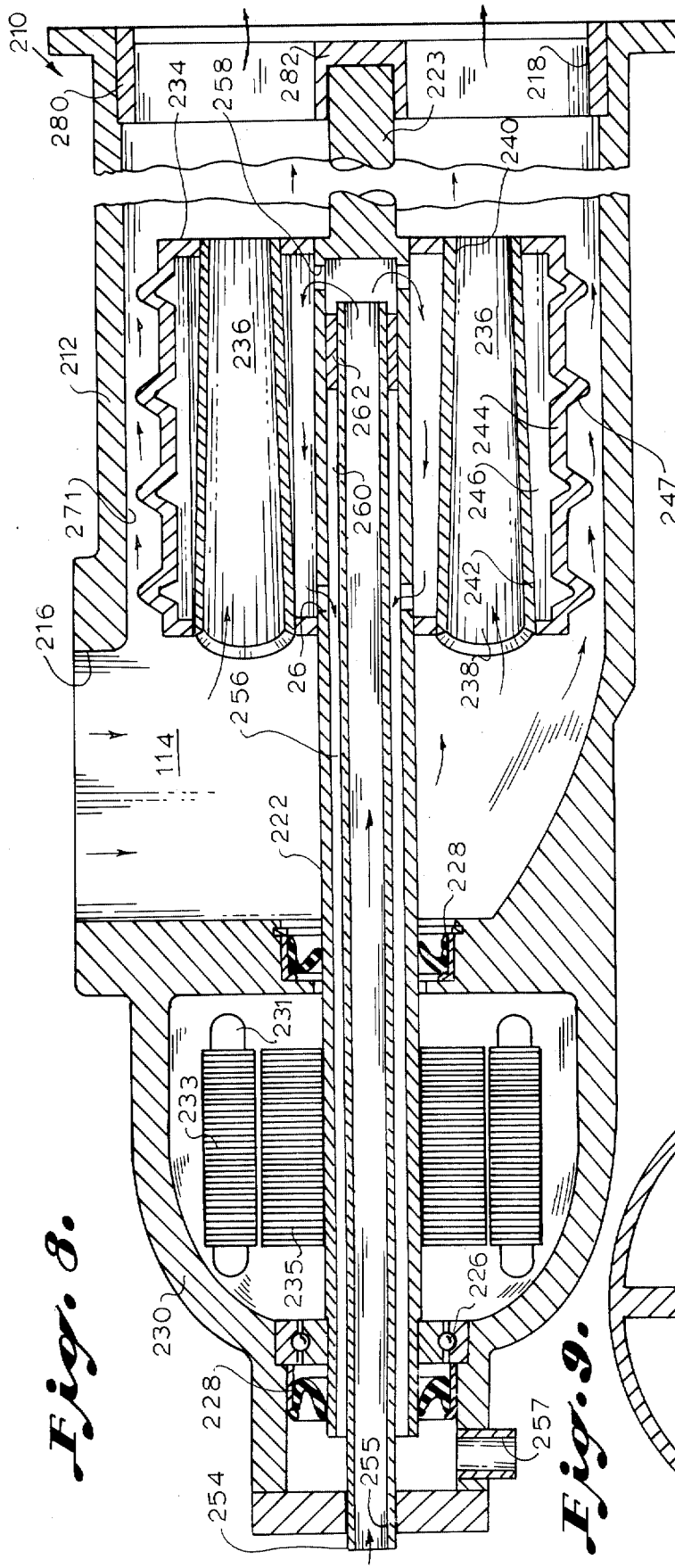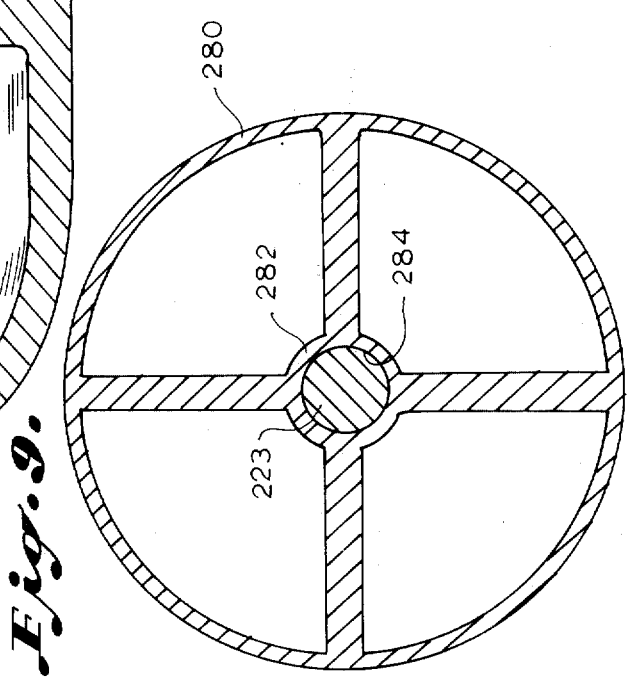

MULTI-PURPOSE APPARATUS FOR HEATING OR COOLING FLUIDS

BACKGROUND OF THE INVENTION

1. Field of the Invention

The present invention relates to apparatus adapted to heat or cool a moving fluid, and, in one embodiment, relates to apparatus useful for evaporating and/or humidifying volatile fluids such as fuel-air mixtures for internal combustion engines. In another embodiment, the apparatus is useful in radiator or heat exchange applications.

2. Description of the Prior Art

In U.S. Pat. No. 3,398,900, Sweeney and I disclose a high sheer dispersion unit useful for reducing the particle size of any granular solid, by premixing or blending in a liquid medium and then pumping into another unit where the pressure employed varies in accordance with the viscosity of the blend and the flow rate. The structure described in the aforementioned patent includes a housing having a chamber with a rotor positioned within the chamber and mounted on a hollow shaft. The periphery of the rotor includes indentations therein cooperating with inlets and outlets so as to achieve a shearing action of particles passing across the surface of the rotor between the indentations in the rotor. The hollow shaft described therein has a tube extending therethrough so that a heating substance, such as water, may be pumped through the tube and into the rotor to heat the work during the shearing operation.

Recent developments in the field of internal combustion engines have been directed toward precombustion fuel heaters which serve to preheat the combustible product prior to entry into the engine, to render the operation of the engine more efficient. Additionally, there have been numerous developments in the area of cooling and heating fluids whereby a radiation or heat exchange effect is employed to heat or cool a moving fluid.

SUMMARY OF THE INVENTION

The present invention contemplates apparatus for heating or cooling a first fluid comprising a housing having a chamber, the housing having an inlet and an outlet therethrough with a flow path for the first fluid defined therebetween. The inlet communicates between the chamber and a source of the first fluid. A rotor is rotatably positioned within the chamber, and has at least one tubular member passing through the rotor and in the flow path between the inlet and the outlet. The apparatus is further provided with means for rotating the rotor and means for heating or cooling the periphery of the tubular member to effect a change in the temperature of the first fluid passing therethrough.

In addition to the apparatus in accordance with the present invention just described, various structural modifications may be employed with this basic arrangement so as to render the basic structure useful for a variety of applications. For example, the basic structure described above may be fitted with a carburetor of conventional design in the inlet, so as to atomize a volatile fuel prior to entry into the chamber. Such an arrangement is useful as an evaporator and humidifier for internal combustion engine fuels. Further, the basic structure may be provided with partitioning means within the chamber so as to define multiple passageways, thus rendering the modified structure useful as a radiator, or heat exchange device, to either heat or cool the working fluid. In this regard, it will be appreciated by those skilled in the art that the apparatus of the present invention is equivalent for both heating and cooling purposes.

THE DRAWINGS

FIG. 2 is a front view of a portion of the apparatus of FIG. 1.

FIG. 3 is a top, cross-sectional view of the portion shown in FIG, 2, taken along the lines 3–3'.

FIG. 4 is a side view, in cross-section, of an alternate embodiment of a portion of the apparatus shown in FIG. 1.

FIG. 5 is a cross-sectional side view of another embodiment of the apparatus in accordance with the present invention.

FIG. 6 is an end view of the apparatus of FIG. 5, as viewed from the right end of the drawing as depicted in FIG. 5.

FIG. 7 is a top plan view of a portion of the apparatus of FIG. 5.

FIG. 8 is a cross-sectional side view of another embodiment of the apparatus in accordance with the present invention.

FIG. 9 is an end view of the apparatus of FIG. 8, taken from the end on the right hand extremity of FIG. 8.

DETAILED DESCRIPTION

Figure 1:
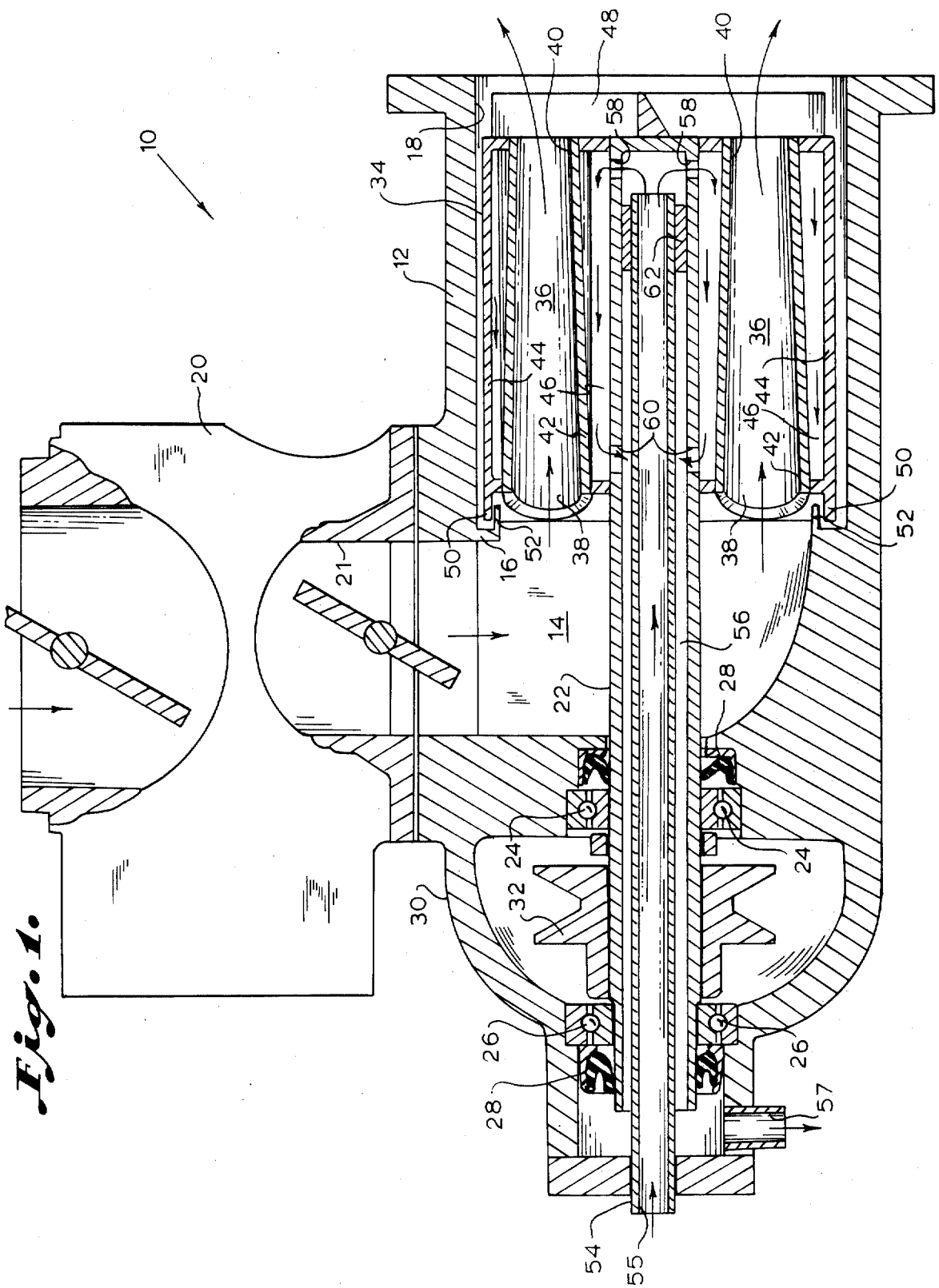
FIG. 1 is a side view, partially in cross-section, of a first embodiment of the present invention.

Four different embodiments of apparatus in accordance with the present invention will now be described with reference to the drawings, as set forth below.

EXAMPLE ONE

A first example of apparatus in accordance with the present invention will be described with reference to FIGS. 1, 2 and 3. The apparatus, referred to generally as 10, includes a housing 12 having an internal cavity or chamber 14, and an inlet 16 and an outlet 18, with a flow path for a first fluid defined therebetween. Although not essential, the chamber may be formed of a cast metal, such that the inlet 16 enters the chamber 14 normal to the direction of the flow path out of the outlet 18, as is specifically shown in FIG. 1. In accordance with this embodiment of the present invention, a carburetor 20 of conventional design is fixed to the housing and mounted such that the throat 21 of the carburetor communicates with the inlet 16 of the housing 12.

The apparatus 10 further includes a bell casing 30 joined to the housing 12, with a hollow shaft 22 supported by bearings 24 and 26 and extending through the bell casing 30 and the chamber 14 of the housing 12. The shaft 22 is supported by bearings 24 and 26 on opposite sides of the bell casing 30, and is provided with seals 28 to prevent fluid flow between the chamber 14 and the interior of the bell casing 30.

A rotor comprising a cylindrical casing 34 is fixed to the shaft 22 within the chamber 14. The casing 34 includes a plurality of tubular member 36, each of which extends through the cylindrical casing in the flow path between the inlet 16 and the outlet 18.

Now referring to all of FIGS. 1, 2 and 3, the veins 36 include an elliptically extending front orifice 38 and a rear opening 40 which communicates with the outlet 14. The inner periphery of each tubular member 36 is formed of an inner wall 42 surrounded by an outer wall 44 with a space 46 defined therebetween. The outer wall 44 includes an inwardly extending lip 50, the housing 12 being provided with a corresponding lip 52 extending over the outer wall lip 50. The apparatus is further provided with an impeller 48 fixed to the end of the cylindrical casing 34. With specific reference to FIGS. 2 and 3, it can be seen from a review of FIG. 3 that each tubular member 36 extends through the casing 34 in a direction which is other than parallel with respect to the shaft 22 and the axis of the casing 34. When rotated in a clockwise direction (as viewed in FIG. 2), each tubular member 36 imparts a centrifugal force to the first fluid passing therethrough, as will be further described below with respect to the operation of the apparatus 10.

In accordance with one aspect of the present invention, means are provided for heating or cooling the peripheral inner wall 42 of each tubular member 36, such means including, in this example, a tube 54 fixed axially within the hollow shaft 22 (FIG. 1) and having an inlet aperture 55. The tube 54 is spaced from the shaft 22 so as to define a return path 56 between the shaft and the tube for a second fluid, the return path 56 having an exit 57. The cylindrical casing 34 further includes a first opening 58 associated with each tubular member 36, all of the openings 58 communicating between the end of the tube 54 and the space 46 between the inner and outer walls 42 and 44 of the tubular member 36. Second openings 60 communicating between the space 46 and the return path 56 between the tube 54 and the rotatable shaft 22. A bearing seal 62 is provided between the extremity of the tube 54 and the inner periphery of the shaft 22, to prevent the second fluid from flowing from the tube 54 directly into the return path 56.

The apparatus 10 further includes a drive pulley 32 fixed to the rotatable shaft 22 and mounted within the bell casing 30, the pulley being driven by conventional belt means so as to rotate the shaft 22.

Operation of the apparatus of FIG. 1 will now be described. In use, a volatile fuel-air mixture is atomized in the carburetor 20 and passed through the inlet 16 into the chamber 14. The rotation of the shaft 22 causes the fuel-air mixture to be drawn into the tubular member 36, wherein the fuel-air mixture is heated by means of another fluid passing through the tube 54 from inlet aperture 55, the openings 58 into the space 46 and around the inner wall 42 of each tubular member 36. The heat contained in this second fluid is dissipated and the second fluid is forced out of the opening 60, along the return path 56 and out of the exit aperture 57.

The heated fuel-air mixture is then pumped out of the tubular member 36 centrifugally, as is indicated by the arrows flowing out of the tubular member. The resulting fuel-air mixture is thoroughly mixed and is preheated prior to entry into the internal combustion engine (not shown). It will be appreciated by those skilled in the art that the shaft 22 may be rotated by a drive belt attached to the drive shaft of an associated engine. It will be further appreciated by those skilled in the art that the heating fluid may be supplied from a conventional radiator of an automobile, or alternatively may comprise a cooling fluid if a cooling of the volatile substance entering the chamber 14 through the inlet 16 is desired.

EXAMPLE TWO

A second example of apparatus in accordance with the present invention is described with reference to FIG. 4, which illustrates an alternate embodiment of the shaft and cylindrical casing arrangement. The alternate embodiment, referred to generally as 70, comprises a rotatable shaft 72 to which is affixed a cylindrical casing 74 similar to the casing 34 of FIG. 1, and includes a tubular member 76 defined by an inner peripheral wall 78 and an outer wall 80, with a space 82 defined therebetween. An electrical heating coil 84 surrounds the inner wall 78 adjacent each tubular member 76, the heating coils 84 being coupled through conductors 86 and 88 extending through the center of the hollow shaft 72. Electrical energy is supplied to the coils 84 via rotating contacts 90 and 92 of conventional design. The coils 84 serve to heat the inner peripheral wall 78 of each tubular member in a manner previously described with reference to the circulating fluid in FIG. 1.

EXAMPLE THREE

A third embodiment of apparatus in accordance with the present invention will now be described with reference to FIGS. 5, 6 and 7. The apparatus, referred to generally as 110, is similar in many respects to the apparatus of Example One, and like elements in FIG. 5 have been designated with like numerals, preceded by the numeral 1; for example, the casing 112 of FIG. 5 corresponds to the casing 12 of FIG. 1.

In addition to the elements of FIG. 5 like the elements of FIG. 1, the apparatus 110 further includes a shaft extension 123 extending from the rotating shaft 122. The shaft extension 123 is fitted in a bearing surface of an end member 182, which will be described in greater detail below.

Further, the apparatus 110 of FIG. 5 includes a cylindrical casing 134, the outer peripheral wall 144 of which is provided with raised radiating fins 147. The apparatus 110 further includes partitioning means for dividing the chamber 114 into two separate passageways. This partitioning means includes a first cone-shaped partition 170 fitted forward of the cylindrical casing 134, the cone-shaped partition 170 communicating with the first inlet 116 of the housing 112. The partitioning means also includes a second cone-shaped partition 172 aft of the cylindrical casing 134 and communicating with the outlet 118. The partitions 170 and 172 thus divide the chamber 114 into distinct first and second passageways 174 and 176, respectively. The housing 112 is provided with a second inlet 173 communicating with the second passageway 176, and a second outlet 175 also communicating with the second passageway.

Referring now to FIGS. 5 and 6, the apparatus 110 includes an end member defined by three concentric rings 180, 182 and 186. The innermost concentric ring 182 includes an aperture 184 into which bears the shaft extension 123. The middle concentric ring 186 is provided with seals 185 between that concentric ring and the cone-shaped partition 172. The apparatus 110 may be further provided with conduit means (not shown) for conducting the output from the outlet 118 directly into the inlet 155 of the tube 154.

Operation of the apparatus 110 as a radiator or heat exchange device will now be described. Initially, a first fluid may be passed through the inlet 116 and into the first passageway 174. Rotation of the shaft 122 causes the first fluid to be pumped through the tubular member 136 and thereafter out of the outlet 118, in the manner described above with reference to Example One. Although not limited to such, the first fluid may constitute the hot water in an automobile radiator, for example. As noted above, the output from the outlet 118 may be returned via piping 190 to the inlet 155 of the tube 154, and thereafter used to further dissipate the heat of the first fluid passing through the veins 136, by passage through the space 146 between the inner and outer peripheral walls 142 and 144 respectively of the tubular member 136.

Additionally, a second, cooling fluid such as air or water may be passed through the second inlet 173 into the second passageway 176. As this cooling fluid moves across the radiating fins 147, additional cooling of the first fluid passing through the space 146 is carried out. Subsequently, the cooled first fluid may be returned to the radiator or other reservoir as an output from the outlet 157.

EXAMPLE FOUR

A fourth embodiment of apparatus in accordance with the present invention, referred to generally as 210, will now be described with reference to FIGS. 8 and 9. The apparatus 210 is similar to the apparatus 110 of Example Three, except that the cone-shaped partitions 170 and 172 are omitted, and the middle concentric ring 186 is likewise omitted. The apparatus 210 thus is similar to the apparatus of Example One and shown in FIG. 1, except that a space 271 is defined between the outer wall 244 of the cylindrical casing 234, such that the first fluid entering the chamber 114 may flow across the fins 247 to effect further heating or cooling of the first fluid flowing therein. Although not essential, the appartus 210 further includes an extension 223 of the shaft 222 which is rotatably carried in a bearing aperture 284 of the inner concentric circle 282 of the end member 280 (note FIG. 9).

A further difference between the apparatus 210 and the embodiments of FIGS. 1 and 5 is the use of an electric motor in the bell casing 230 to drive the rotating shaft 222, in lieu of the pulley driven arrangement of the previously described arrangements. The motor includes windings 231 and associated stator 233, surrounding a rotor 235 fixed to the shaft 222.

The apparatus 210 operates in a manner essentially identical to that described with reference to the apparatus 10 of FIG. 1, except that an increased surface area at the radiating tubular member 247 and the outer peripheral wall 244 is provided for more efficient cooling of the first fluid entering the chamber 114 via the inlet 216.

It will be appreciated by those skilled in the art that the various embodiments of the apparatus of the present invention, as described above, are useful for simultaneously pumping and heating or cooling moving fluids in a wide variety of applications.

I claim:
1. Apparatus for heating or cooling a first fluid comprising:
   a housing having a chamber, said housing having an inlet and an outlet therethrough with a flow path for said first fluid defined therebetween, said inlet communicating between said chamber and a source of said first fluid;
   a rotor rotatably positioned within said chamber, said rotor having at least one tubular member defining a passageway extending within said rotor and in said flow path between said inlet and said outlet;
   means for rotating said rotor such that said tubular member communicates between said inlet and said outlet constantly during each cycle of rotation such that there is a constant flow of said first fluid between the inlet and outlet during rotation of said rotor; and
   means for heating or cooling the periphery of said tubular member to effect a change in the temperature of said first fluid passing therethrough.

2. Apparatus as recited in claim 1 wherein said rotor comprises a cylindrical casing with said tubular member extending therethrough.

3. Apparatus as recited in claim 2 further comprising additional tubular members extending through said cylindrical casing.

4. Apparatus as recited in claim 3 wherein all of said tubular members extend through said casing at an angle other than parallel with respect to said shaft.

5. Apparatus as recited in claim 2 wherein said heating or cooling means comprises:
   a hollow shaft rotatably supported in said chamber with said cylindrical casing mounted thereon;
   a tube fixed axially within said hollow shaft; and
   means for providing a second fluid into said tube.

6. Apparatus as recited in claim 5 wherein said casing further comprises:
   a first, inner wall surrounding said tubular member;
   a second wall surrounding said first wall with a space therebetween; and
   said casing further including a first opening communicating between the extremity of said tube and said space such that said second fluid can circulate in said space.

7. Apparatus as recited in claim 6 wherein said heating or cooling means further comprises:
   said tube spaced from said shaft to define a return path therebetween for said second fluid;
   said casing further including a second opening communicating between said space and said return path; and
   means between the extremity of said tube and said shaft for preventing said second fluid from flowing from said tube directly into said return path.

8. Apparatus as recited in claim 2 further comprising means for imparting a centrifugal force to said first fluid passing through said tubular member.

9. Apparatus as recited in claim 8 wherein said centrifugal force imparting means comprises said tubular member extending through said casing in a first, outward direction which is other than parallel to the axis of said cylindrical casing.

10. Apparatus as recited in claim 9 wherein said centrifugal force imparting means further comprises means for rotating said casing in a direction which forms an obtuse angle with respect to said first direction.

11. Apparatus as recited in claim 10 wherein said rotating means comprises:
   a rotatable shaft extending through said chamber with said casing fixed thereto; and
   a pulley drive wheel fixed to said shaft exterior of said chamber.

12. Apparatus as recited in claim 2 wherein said heating or cooling means comprises:
   a heating coil disposed in the wall of said vein;
   means extending through said casing for supplying electrical energy to said coil.

13. Apparatus as recited in claim 1 further comprising means communicating with said inlet for atomizing said first fluid prior to entering said chamber.

14. Apparatus as recited in claim 13 wherein said atomizing means comprises a carburetor.

15. Apparatus as recited in claim 1 further comprising:
- another inlet adjacent to said one inlet, said another inlet communicating with a source of a second fluid;
- another outlet adjacent to said one outlet;
- partitioning means extending through said chamber and dividing said chamber into first and second passageways, said first passageway communicating between said one inlet and said one outlet only through said tubular member said second passageway communicating between said another inlet and said another outlet, the outer periphery of said rotor defining a surface of said second passageway.

16. Apparatus as recited in claim 15 wherein said rotor further comprises a cylindrical casing mounted with said tubular member extending therethrough, the outer peripheral surface of said casing having a plurality of radiating fins extending into said second passageway.

17. Apparatus as recited in claim 16 wherein said heating or cooling means comprises:
- a hollow shaft rotatably supported in said chamber;
- a tube fixed axially within said hollow shaft; and
- means for providing a third fluid into said tube.

18. Apparatus as recited in claim 17 wherein said casing further comprises:
- a first inner wall surrounding said tubular member;
- a second wall surrounding said first wall with a space therebetween; and
- said casing further includes a first opening communicating between the extremity of said tube and said space such that said third fluid can circulate in said space.

19. Apparatus as recited in claim 18 wherein said heating or cooling means further comprises:
- said tube spaced from said shaft to define a return path therebetween for said third fluid;
- said casing further including a second opening communicating between said space and said return path; and
- means between the extremity of said tube and said shaft for preventing said third fluid from flowing from said tube directly into said return path.

20. Apparatus as recited in claim 19 wherein said third fluid comprises the output of said first fluid from said one outlet.

21. Apparatus as recited in claim 1 further comprising a passageway between the outer periphery of said rotor and the inner periphery of said housing.

22. Apparatus as recited in claim 1 wherein said means for rotating said rotor comprises an electric motor.

* * * * *